United States Patent
Caterino et al.

(10) Patent No.: US 10,580,240 B2
(45) Date of Patent: Mar. 3, 2020

(54) USE OF MOBILE DEVICE TO CONFIGURE A LOCK

(71) Applicant: ASSA ABLOY AB, Stockholm (SE)

(72) Inventors: Mark Anthony Caterino, Prospect, CT (US); Fredrik Carl Stefan Einberg, Huddinge (SE); Philip Hoyer, Richmond (GB); Daniel Berg, Sundbyberg (SE)

(73) Assignee: ASSA ABLOY AB (SE)

( * ) Notice: Subject to any disclaimer, the term of this patent is extended or adjusted under 35 U.S.C. 154(b) by 74 days.

(21) Appl. No.: 15/571,875

(22) PCT Filed: May 20, 2016

(86) PCT No.: PCT/IB2016/000789
§ 371 (c)(1),
(2) Date: Nov. 6, 2017

(87) PCT Pub. No.: WO2016/185283
PCT Pub. Date: Nov. 24, 2016

(65) Prior Publication Data
US 2018/0137704 A1    May 17, 2018

Related U.S. Application Data

(60) Provisional application No. 62/164,101, filed on May 20, 2015, provisional application No. 62/198,236, filed on Jul. 29, 2015, provisional application No. 62/198,226, filed on Jul. 29, 2015.

(51) Int. Cl.
*G05B 19/02* (2006.01)
*G07C 9/00* (2020.01)
(Continued)

(52) U.S. Cl.
CPC ........ *G07C 9/00817* (2013.01); *G06F 21/35* (2013.01); *G07C 9/00103* (2013.01);
(Continued)

(58) Field of Classification Search
None
See application file for complete search history.

(56) References Cited

U.S. PATENT DOCUMENTS

| 2012/0213362 A1* | 8/2012 | Bliding | G07C 9/00309 380/44 |
| 2013/0318519 A1* | 11/2013 | Coolidge | G06F 8/65 717/173 |

(Continued)

OTHER PUBLICATIONS

International Search Report for International Patent Application No. PCT/IB2016/000789, dated Aug. 29, 2016, 6 pages.
(Continued)

*Primary Examiner* — Adolf Dsouza
(74) *Attorney, Agent, or Firm* — Sheridan Ross P.C.

(57) ABSTRACT

Methods, devices, and systems are provided for configuring a reading device and/or a lock using a mobile device. The mobile device, running a configuration application, communicates with the reading device, determines a configuration of the reading device, and makes a determination for configuring the reading device based at least partially on configuration information provided by the reading device.

20 Claims, 4 Drawing Sheets

(51) Int. Cl.
  *H04W 4/80* (2018.01)
  *G06F 21/35* (2013.01)
  *H04M 1/725* (2006.01)

(52) U.S. Cl.
  CPC .... *G07C 9/00309* (2013.01); *H04M 1/72533* (2013.01); *H04W 4/80* (2018.02); *G07C 2009/00388* (2013.01); *G07C 2009/00412* (2013.01); *G07C 2009/00825* (2013.01); *G07C 2009/00841* (2013.01)

(56) References Cited

U.S. PATENT DOCUMENTS

| | | |
|---|---|---|
| 2014/0051407 A1 | 2/2014 | Ahearn et al. |
| 2014/0118107 A1* | 5/2014 | Almomani ......... G07C 9/00309 340/5.22 |
| 2016/0318519 A1 | 11/2016 | Hirai et al. |

OTHER PUBLICATIONS

Written Opinion for International Patent Application No. PCT/IB2016/000789, dated Aug. 29, 2016, 9 pages.

Second Written Opinion for International Patent Application No. PCT/IB2016/000789, dated Jun. 2, 2017, 13 pages.

International Preliminary Report on Patentability for International Patent Application No. PCT/IB2016/000789, dated Aug. 28, 2017, 29 pages.

* cited by examiner

USE OF MOBILE DEVICE TO CONFIGURE A LOCK

CROSS REFERENCE TO RELATED APPLICATIONS

The present application is a national stage application under 35 U.S.C. 371 of PCT Application No. PCT/IB2016/000789, having an international filing date of May 20, 2016 which claimed the benefits of and priority, under 35 U.S.C. § 119(e), to U.S. Provisional Application Ser. Nos. 62/164,101, filed on May 20, 2015, entitled "Configuration Reporting"; 62/198,236, filed on Jul. 29, 2015, entitled "Reader Setup/Rekeying with Dedicated Card"; and 62/198,226, filed on Jul. 29, 2015, entitled "Use Mobile Device to Configure a Lock." The entire disclosures of the applications listed above are hereby incorporated by reference, in their entirety, for all that they teach and for all purposes.

FIELD

The present disclosure is generally directed to access control systems and more specifically to devices that are configured to provide access information for access control systems.

BACKGROUND

In general, access control systems rely upon lock and key principles to grant or deny access to a secure asset. Whether the keys are configured as physical keys presented to a mechanical lock or virtual keys presented to an access control unit, most keys include specific features or characteristics that are either recognized by or match lock features before access is granted to the asset. Some access control systems employ the use of various portable devices to maintain credential information for presentation to a reading device. The portable devices are generally configured to communicate with the reading device via wireless communication protocols.

At times, locks and/or reading devices are configured to, among other things, update installed firmware, software, settings, features, etc. In some cases, configuring a reading device may include adding, replacing, and/or removing keys or portions thereof from the reading device. In another example, a reading device may be configured for operation by installing a key set or a portion of the key set, authorized key list, blacklist, etc., onto a memory of the reading device. Configuring a reading device, especially one without a keypad, can require a physical connection to the reading device, a dedicated configuration tool, and a cumbersome configuration procedure.

SUMMARY

It is with respect to the above issues and other problems that the embodiments presented herein were contemplated. In general, embodiments of the present disclosure provide methods, devices, and systems for configuring a reading device and/or a lock using a mobile device. In some embodiments, the mobile device may include a non-transitory computer readable medium with a configuration application stored thereon. The configuration application may be run by a processor of the mobile device and configured to setup, initialize, activate, deactivate, update, or otherwise configure a reading device and/or a lock in an access control system. By way of example the configuration application may be configured to update firmware in a reading device using the mobile device. In another example, the configuration application may be used to interrogate a particular reading device and determine a configuration and/or programming associated with the reading device.

In one embodiment, the reading device may provide configuration information to the mobile device. The reading device may provide this information in response to an interrogation signal provided by the mobile device. The interrogation signal may include a key, identification, and/or other code that is configured to authorize the mobile device for configuring the reading device. In some cases, the mobile device may be authorized (e.g., via authentication and/or verification, etc.) by the reading device before the reading device provides the configuration information. This authorization may include the reading device and/or the mobile device communicating with a trusted credentials management system. Upon receiving the configuration information from the reading device, the mobile device may configure and/or program the reading device.

In some embodiments, templates may be used for programming various types of access points, reading devices, locking systems, doors, etc. For example, a particular type (e.g., style, make, model, manufacturer, asset protection level, etc.) of access point may include a reading device and locking system having a defined set of features. This defined set of features may include a number of features that are unique to the type of access point. As such, a template may be configured for the particular type of access point that, among other things, allows for quick and easy configuration by an administrator using the mobile device. The templates may be stored in a memory of the mobile device, a memory of the reading device, on a remote memory, and/or associated with a remote server. In any event, the templates may be loaded by the configuration application running via the mobile device. In one embodiment, the configuration information provided by the reading device may be used (e.g., by the mobile device, etc.) to determine an appropriate template for use by the configuration application.

It is an aspect of the present disclosure that information about reading device configurations, such as the configurations made via a mobile device and the configurations of reading devices interrogated by a mobile device, may be communicated to an access server, a communication device, or other system/third party. In some cases, this information may be stored in a memory associated with the mobile device, communication device, server, etc. Among other things, this information may provide data regarding what types of reading devices have been configured and in what type of way the reading devices were configured. Additionally or alternatively, this information may be used to map a configuration associated with one or more reading devices in an access control system. In some embodiments, the configuration information associated with one or more reading devices, doors, access points, etc., may be stored in an easy-to-access memory location. For instance, the configuration information may be stored as a database in the cloud or a remote server platform. In any event, the configuration information may include information for how access points (e.g., reading device, doors, etc.) are setup. Additionally or alternatively, this configuration information may be accessed and used to setup other access points in the access control system (e.g., via a mobile device, etc.).

In some embodiments, the mobile device may be configured to communicate with one or more reading devices via any number of communications protocols associated with the mobile device. Examples of communications protocols can include, but are in no way limited to, the protocol or protocols associated with near field communication (NFC), radio frequency identification (RFID)(e.g., operating at 125 kHz, 13.56 kHz, etc.), Bluetooth® wireless communication, Bluetooth® Low Energy (BLE), Personal Area Network (PAN), Body Area Network (BAN), cellular communications, WiFi communications, and/or other wireless communications.

In one embodiment, the reader may authenticate the mobile device card by communicating with a trusted credentials management system. Additionally or alternatively, the authentication of a mobile device may include the reading device accessing a secure memory, whether located locally (e.g., in the reading device, on a local area network, attached storage device, etc.) or remotely (e.g., in the cloud, across a communications network, or on a remote server memory, etc.), for authentication information. In some cases, the authentication information may be at least a portion of a cryptosystem, cryptographic key value, cryptographic hash function, public key, private key, combinations thereof, and/or the like. In any event, the authentication may utilize authentication information provided by the mobile device and authentication information stored in a secure/managed memory in determining an authentication match.

Once the mobile device card is authenticated, or authorized, the reading device may allow the mobile device to provide configuration information. In some cases, the reading device may provide the mobile device with an authorization key that allows this configuring ability. The authorization key may be stored in a memory associated with the mobile device, the configuration application, etc.

In some embodiments, symmetric and/or asymmetric encryption may be used in the transfer of information, verification of information, authentication of information, and/or storing information, etc. By way of example, a public key may be stored on the mobile device which can be used for an administrative mode of operation, etc.

As provided herein, the mobile device may be configured to operate in conjunction with one or more reading devices. In some embodiments, the reading devices may be provided by a manufacturer different from the mobile device. It is an aspect of the present disclosure that the configuration application may include instructions configured to determine the manufacturer and/or type of the reading device and provide the necessary interface to a particular reading device based on the determined manufacturer and/or type.

The mobile device may include electronics that can be powered by a reading device. One example of such electronics may be a mobile device having MID components, (e.g., a capacitor, antenna, etc.). In this example, when the mobile device is presented within an RFID field provided by the reading device, the reading device may provide energy via the REID field that can be stored in the capacitor of the mobile device.

The term "computer-readable medium," as used herein, refers to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein, "credential information" is any data, set of data, encryption scheme, key, and/or transmission protocol used by a particular device (e.g., a "credential device") to authenticate and/or verify its authenticity with a reader, mobile device, and/or interrogator.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Copyright and Legal Notices

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Figure 1:
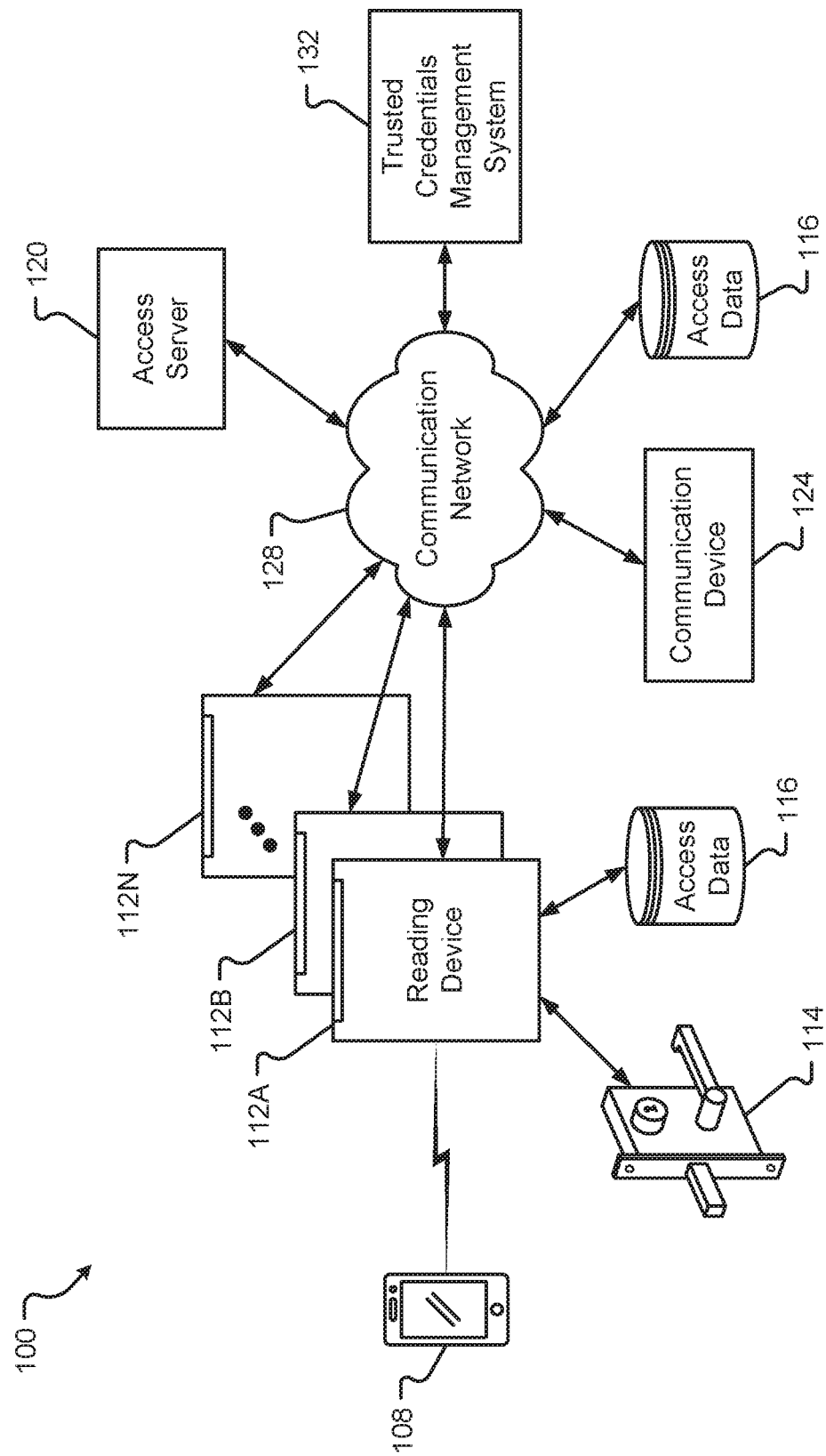
FIG. 1 is a diagram depicting an access control system in accordance with embodiments of the present disclosure.

FIG. 1 is a diagram depicting an access control system 100 for keying one or more reading devices 112A-N via a mobile device 108 in accordance with embodiments of the present disclosure. In one embodiment, the access control system 100 comprises at least one reading device 112 and a portable communications, or mobile device 108. The reading device 112 may include an access data memory 116. The access data memory 116 may be configured to store access information, identification data, rules, program instructions, and/or other data associated with performing access operations of an access control system 100. In some embodiments, the reading device 112 may be configured to communicate with an access data memory 116 across a communication network 128. The access data memory 116 may be located remotely, locally, and/or locally and remotely, from the reading device 112. In one embodiment, the reading device 112 and/or the mobile device 108 may be configured to communicate with a trusted credentials management system 132 across a communication network 128.

The mobile device 108 may be configured to communicate with a reading device 112 across one or more wireless communication connections. These one or more wireless communication connections can include communications via at least one of conventional radio protocols, proximity-based wireless communication protocols, Bluetooth™, NFC, RF, and other wireless communication networks and/or protocols. In some cases, communications between the mobile device 108 and the reading device 112 may be established automatically when the mobile device 108 enters an active zone of an interrogating reading device 112. Additionally or alternatively, communications between the mobile device 108 and the reading device 112 may be established automatically when the mobile device 108 enters an active zone of an interrogating reading device 112. In one embodiment, the active zone of the reading device 112 may be defined as a three-dimensional space where the intensity of RF signals emitted by the reading device 112 exceeds a threshold of sensitivity of the mobile device 108 and the intensity of RE signals emitted by the mobile device 108 exceeds a threshold of sensitivity of the reading device 112.

In some embodiments, the mobile device 108 may be configured to communicate with a reading device 112 across a communication network 128. The communication network 128 can include communication via at least one of conventional radio networks, wireless communication networks, Zig-Bee, GSM, CDMA, WiFi, and/or using other communication networks and/or protocols as provided herein.

In one embodiment, authentication may be required between the mobile device 108 and the reading device 112 before further communications, or access controls, are enabled. In one embodiment, authentication may be required between the mobile device 108 and the reading device 112 before further communications, or access controls, are enabled. Additionally or alternatively, the further communications may provide communications in which access control information (e.g., keys, codes, credentials, etc.) are shared, provided, loaded, transferred, and/or stored, in some embodiments, the authentication may be provided via one-way or mutual authentication. Examples of authentication may include, but are not limited to, simple authentication based on site codes, trusted data formats, shared secrets, and/or the like. As can be appreciated, access control information is more sensitive and may require more involved validation via, for example, an encrypted exchange of access control information.

In some embodiments, the reading device 112 may be configured to request specific setup information from the mobile device 108. This information may be used to grant or deny access to configuration settings, secure memory, or other administrative controls for a user having the mobile device 108. In one embodiment, the information may be authenticated and/or validated by referring to information stored in access data memory 116 or some other memory associated with the reading device 112 and/or trusted credentials management system 132. Validation may include referring to information stored in access data memory 116 or some other memory associated with the mobile device 108. Typically, a reading device 112 is associated with a particular asset (e.g., a door protecting access to a secure room, a computer lock protecting sensitive information or computer files, a lock on a safe, and the like).

In accordance with embodiments of the present disclosure, the reading device 112 may receive one or more configuration instructions (e.g., and/or other information etc.) from the mobile device 108 to configure specific features associated with the reading device 112 and/or a lock 114 associated with the reading device 112. In general, each reading device 112 may be configured to control and/or actuate a lock 114 or locking system. This control and/or actuation may include energizing a locking element associated with the lock 114, selectively powering a component of the lock 114, or otherwise causing the lock 114 to allow or prevent access to an asset.

The access server 120 may include a processor, a memory, and one or more inputs/outputs. The memory of the access server 120 may be used in connection with the execution of application programming or instructions by the processor, and for the temporary or long term storage of program instructions and/or data. As examples, the memory may comprise RAM, DRAM, SDRAM, or other solid state memory. Additionally or alternatively, the access server 120 may communicate with an access data memory 116. Like the memory of the access server 120, the access data memory 116 may comprise a solid state memory or devices. The access data memory 116 may comprise a hard disk drive or other random access memory.

In some embodiments, the reading device 112 may be configured to communicate with one or more devices across a communication network 128. For example, the reading device 112 may communicate with a mobile device 108 across the communication network 128. Among other things, this communication can allow for back-end authentication and/or provide notifications from the reading device 112 to the mobile device 108. In some embodiments, the reading device 112 may be configured to authenticate a mobile device 108 (e.g., allowing configuration controls, etc.), via a trusted credentials management system 132. The communication network 128 may comprise any type of known communication medium or collection of communication media and may use any type of protocols to transport messages between endpoints. The communication network 128 may include wired and/or wireless communication technologies. The Internet is an example of the communication network 128 that constitutes an Internet Protocol (IP) network consisting of many computers, computing networks, and other communication devices located all over the world, which are connected through many telephone systems and other means. Other examples of the communication network 128 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, similar networks used in access control systems between readers and control panels, and any other type of packet-switched or circuit-switched network known in the art. In addition, it can be appreciated that the communication network 128 need not be limited to any one network type, and instead may be comprised of a number of different networks and/or network types. Moreover, the communication network 128 may comprise a number of different communication media such as coaxial cable, copper cable/wire, fiber-optic cable, antennas for transmitting/receiving wireless messages, and combinations thereof.

In some embodiments, the access control system 100 may include at least one communication device 124. A communication device 124 may include, but is not limited to, a mobile phone, smartphone, smart watch, soft phone, telephone, intercom device, computer, tablet, mobile computer, alarm, bell, notification device, pager, and/or other device configured to convert received electrical and/or communication signals. In one embodiment, the communication device 124 may be used to receive communications sent from the mobile device 108, the reading device 112, and/or other device associated with the system 100.

Figure 2:
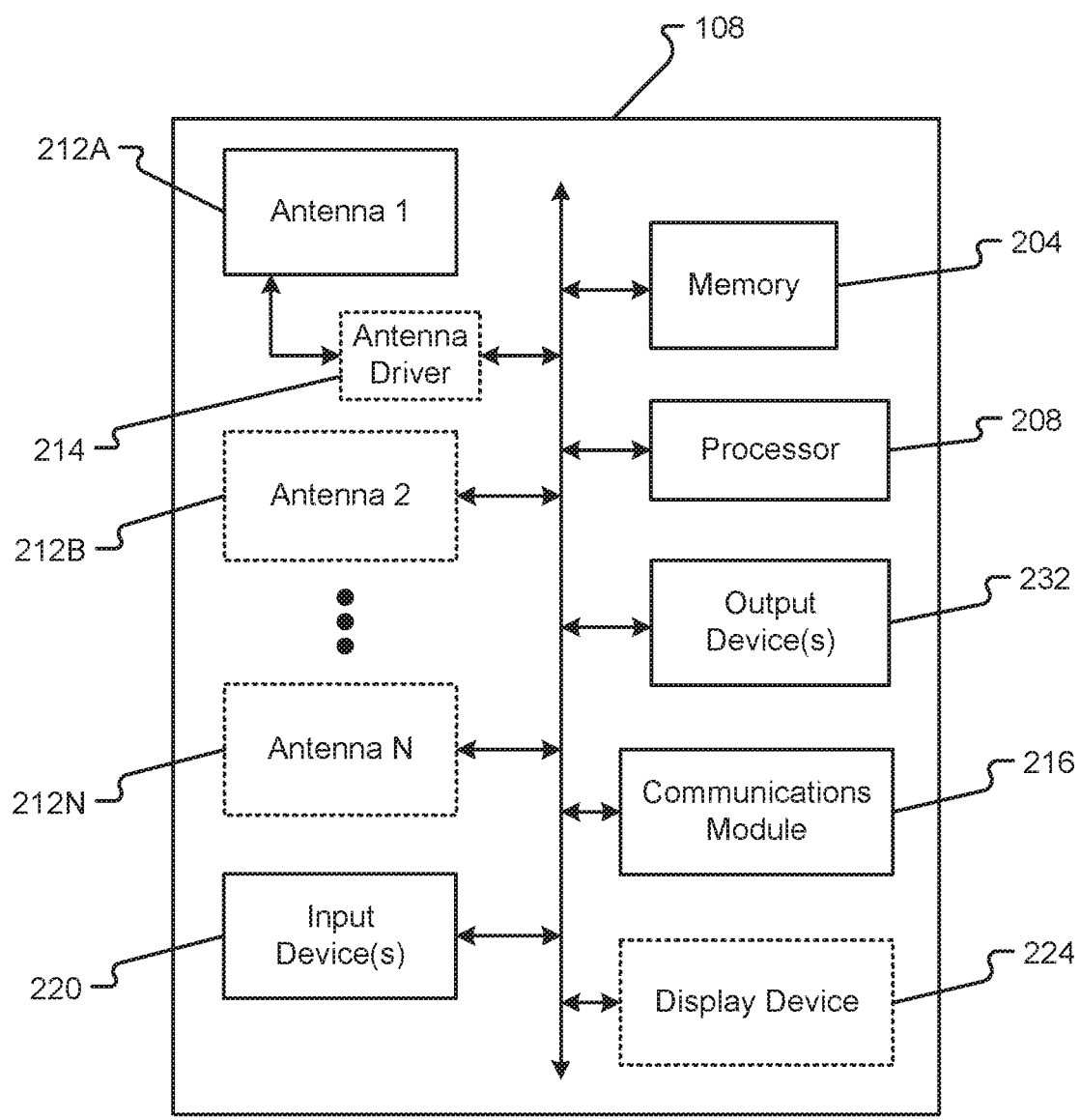
FIG. 2 is a block diagram depicting a mobile device or components thereof in accordance with embodiments of the present disclosure.

FIG. 2 is a block diagram depicting a mobile device 108 in accordance with embodiments of the present disclosure. The mobile device 108 may include one or more components, such as, a memory 204, a processor 208, an antenna 212A-N, and a communications module 216. In some embodiments, the mobile device 108 may further include a power module, one or more input devices 220, a display device 224, and/or at least one output device 232. The processor 208 may be an application specific integrated circuit (ASIC), microprocessor, programmable controller, or the like. As can be appreciated, the communication device 124 may include similar, if not identical, components as those described in conjunction with the mobile device 108.

The memory 204 of the mobile device 108 may be used in connection with the execution of application programming or instructions by the processor 208, and for the temporary or long term storage of program instructions and/or data. The memory 204 may contain executable functions that are used by the processor 208 to run other components of the mobile device 108. In one embodiment, the memory 204 may be configured to store credential information, application instructions, etc. For instance, the credential information may include, but is not limited to, unique identifications, manufacturer identification, passwords, keys, encryption schemes, transmission protocols, and the like. As another example, the memory 204 may be configured to store instructions for a configuration application as disclosed herein. In some embodiments, the memory 204 may be configured to store configuration information, identification information, authentication information, and/or the like. As examples, the memory 204 may comprise RAM, DRAM, SDRAM, or other solid state memory.

The one or more antennas 212A-N may be configured to enable wireless communications between the mobile device 108 and a reading device 112, a communication device 124, and/or some other device. As can be appreciated, the antenna(s) 212A-N may be arranged to operate using one or more wireless communication protocols and operating frequencies including, but not limited to, Bluetooth®, NFC, Zig-Bee, GSM, CDMA, RF, and the like. By way of example, the antenna(s) 212A-N may be RF antenna(s), and as such, may transmit RF signals through free-space to be received by a reading device 112 having an RF transceiver.

In some embodiments, the mobile device 108 may include a power module. The power module may be configured to provide power to the parts of the mobile device 108 in order to operate. In some embodiments, the power module may store power in a capacitor of the power module. In one embodiment, electronics in the power module may store energy in the capacitor and turn off when an RF field is present. This arrangement can ensure that energy is presented to the mobile device 108 minimizing any effect on read distance. Although the mobile device 108 may be configured to receive power passively from an electrical field of a reading device 112, it should be appreciated that the mobile device 108 may provide its own power. For example, the power module may include a battery or other power source to supply power to parts of the mobile device 108.

The mobile device 108 may include a communications module 216 that is configured to communicate with one or more different systems or devices either remotely or locally to the mobile device 108. Thus, the communications module 216 can send or receive messages to or from reading devices 112, communication devices 124, access servers 120, trusted credentials management systems 132, access control systems, or other systems and/or devices. In some embodiments, the communicated information may be provided to, or exchanged with, other components within the mobile device 108.

The input devices 220 may include one or more of touch screens, buttons, switches, cameras, image sensors, microphones, accelerometers, gyroscopes, and the like. The input devices 220 may be configured to receive input from a user or an environment in proximity to the mobile device 108. For example, the configuration application disclosed herein may be configured to present, or render, one or more options, selections, or the like to a touch screen of the mobile device 108. The presented information may be used to, among other things, configure a reading device 112 and/or an associated lock 114. A user may interact with the presented or rendered images by tapping, holding, swiping, spreading, or otherwise providing a touch input to at least one surface of the touch screen.

In some embodiments, the mobile device 108 may include a display device 224. The display device 224 may include any device or physical structure that enables the user to interact with the mobile device 108 by viewing information provided via a display. In one embodiment, the display device 224 may be configured as a video display having an array of pixels. Additionally or alternatively, the display device 224 may be configured as the touch screen described above.

The output devices 232 of the mobile device 108 may include at least one of a speaker, vibration motor, light emitting element, other sound emitting element, and the like. In some embodiments, the output devices 232 may be configured to provide an indication of some instruction provided by the configuration application running via the mobile device 108.

Figure 3:
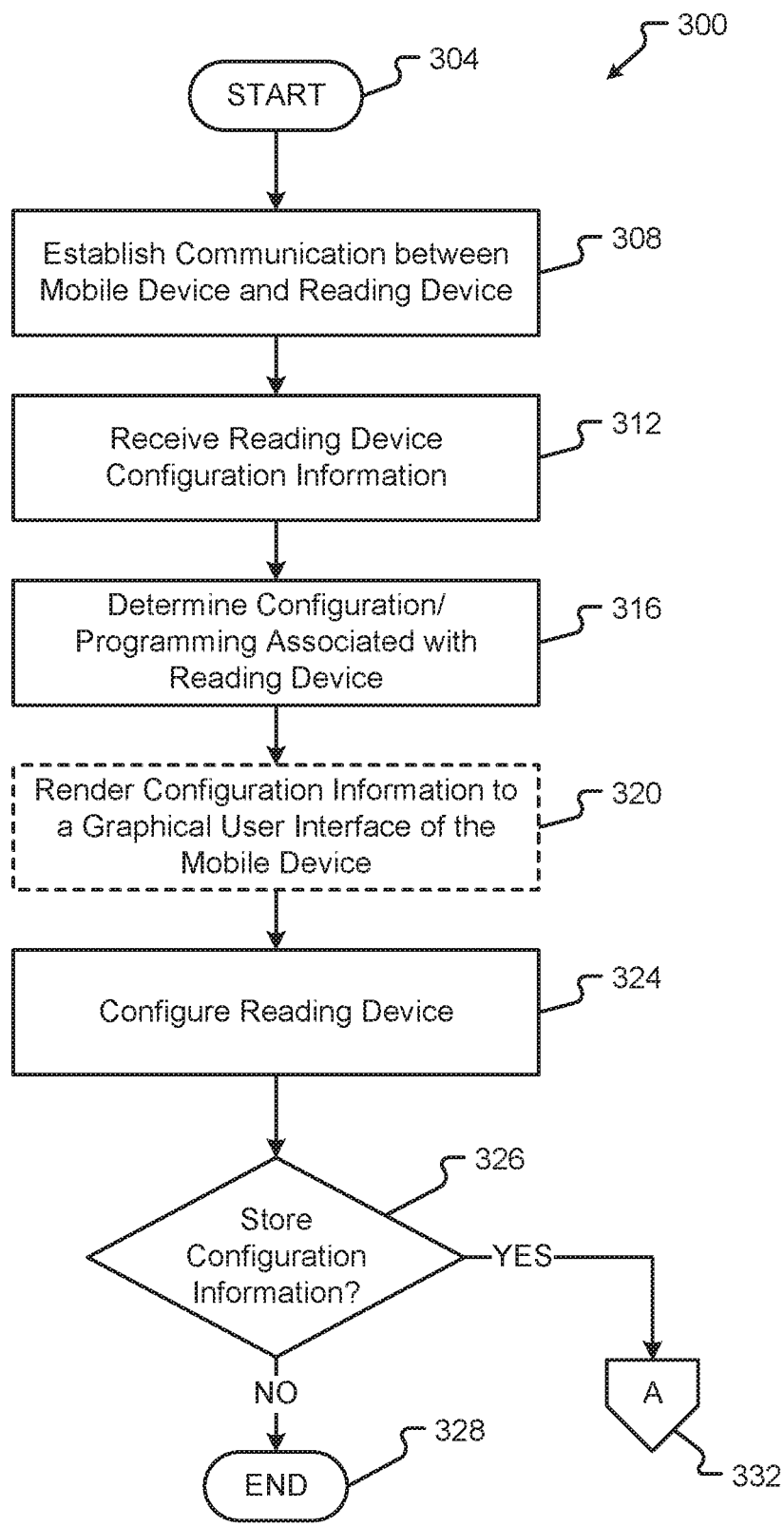
FIG. 3 is a flow chart depicting a method of configuring a reading device in accordance with embodiments of the present disclosure.

Referring now to FIG. 3, a flow chart depicting a method 300 of configuring a reading device 112 is shown in accordance with embodiments of the present disclosure. While a general order for the steps of the method 300 is shown in FIG. 3, the method 300 can include more or fewer steps or can arrange the order of the steps differently than those shown in FIG. 3. Generally, the method 300 starts with a start operation 304 and ends with an end operation 328. The method 300 can be executed as a set of computer-executable instructions executed by a computer system and encoded or stored on a computer readable medium. Hereinafter, the method 300 shall be explained with reference to the systems, components, modules, software, etc. described in conjunction with FIGS. 1-2.

The method 300 begins at step 304 and proceeds when a communication is established between a mobile device 108 and a reading device 112 (step 308). The communication may be established automatically (e.g., without user input) in response to the two devices 108, 112 being brought into a communication range of one another. The communication may, alternatively, be established with the assistance of user input (e.g., in response to receiving a user input that a particular pairing of the devices 108, 112 should be effected). The mobile device 108 may be configured to communicate with a reading device 112 via one or more wireless protocols. The mobile device 108 may be configured to provide software, firmware, setup information, settings, keying information, updates, and/or other information to a reading device 112 for, among other things, configuring the reading device 112 and/or a lock 114 in an access control system 100.

In some embodiments, the communication may be established when the mobile device 108 enters a communication range of the reading device 112. Additionally or alternatively, the communication may be established by the mobile device 108 sending an interrogation signal to the reading device. By way of example, a user may determine to configure a particular reading device 112 and initiate a configuration application running via the mobile device 108. The configuration application, upon initiation, may be configured to automatically send and/or receive communications to and/or from reading devices 112 in proximity to the mobile device 108, via one or more components of the mobile device 108. In one embodiment, the configuration application may require an input to be provided before the mobile device 108 and the configuration application searches for reading devices in a communication proximity.

Once communications are established between the mobile device 108 and the reading device 112, the mobile device 108 may receive configuration information provided by the reading device 112 (step 312). In some embodiments, the reading device 112 may be configured to provide this information in response to receiving a particular signal sent by the mobile device 108. The signal sent by the mobile device 108 may include authentication and/or identification information of the mobile device 108. This information may be required to authorize the mobile device 108 and/or a request from the mobile device 108 for the configuration information. In one embodiment of the present disclosure the authentication and/or identification information provided by the mobile device 108 may be authenticated by the reading device 112 communicating the information to a trusted credential management system 132. In this example, the trusted credentials management system 132 may send a confirmation, for example that the mobile device 108 is authorized to provide configuration instructions, to the reading device 112 across the communication network 128. Continuing this example, the reading device 112 may enter a configuration mode, or allow configuration instructions to be received from the mobile device 108.

In any event, the configuration information received by the mobile device 108 may include one or more of an identification, location, operating status, manufacturer, type, make, current settings, active features, inactive features, versions of software and/or firmware installed, types of software installed, and the like that are associated with the reading device 112. Among other things, the configuration information can be analyzed by the configuration application running via the mobile device 108 to determine a configuration status of the reading device. The results of this analysis can provide valuable information to the configuration application for configuration and/or curation purposes.

The method 300 continues by determining the configuration and/or programming associated with the reading device 112 (step 316). This information may be determined from the configuration information provided by the reading device 112, as described above. The configuration application of the mobile device 108 may determine that at least one feature or aspect of the reading device needs to be configured based at least partially on the configuration information received. For instance, the configuration application may determine that the version of firmware installed on the reading device 112 is older than, or incongruent with, an available and/or approved version listed in a memory associated with the mobile device 108. In this case, the configuration application may determine that an update to the firmware is required. In the event that the configuration information, or the analysis thereof, yields previously unknown or undetermined data, the configuration application may determine to perform a new initialization of the reading device 112 and/or mark the reading device 112 as having a lack of sufficient configuration information. This result may be reported, for example across a communication network 128, to another device, third party, or server associated with the access control system 100.

In some embodiments, the method 300 may continue by rendering reading device data, such as configuration information, results of an analysis of the configuration information, configuration recommendations, or other information, to a graphical user interface or display device 224 of the mobile device 108 (step 320). Additionally or alternatively, the reading device 112 may communicate this reading device data to another device, third party, or server associated with the access control system 100. The graphical user interface may be configured to present a user with various options regarding configuring the reading device. In this case, when a user provides an input corresponding to at least one of the various options, the configuration application of the mobile device 108 may proceed to provide instructions in accordance with the selected option(s)(e.g., to a reading device 112, etc.)

Next, the method 300 may proceed by configuring the reading device 112 (step 324). The reading device 112 may be configured automatically according to one or more rules stored in a memory associated with the mobile device 108 and/or the configuration application. In some embodiments, the reading device 112 may require a configuration authorization code before allowing the mobile device 108 to configure the reading device 112. In some cases, the configuration authorization code may be communicated to the mobile device 108 via the trusted credentials management system 132. In one embodiment, this configuration authorization code may be provided by the trusted credentials management system 132 when the mobile device 108 is authorized, as described in conjunction with step 312. Additionally or alternatively, the configuration authorization code may be stored in a memory of the mobile device 108, whether the mobile device 108 has been preauthorized or authorized as part of the communication with the reading device 112. Configuring the reading device 112 may include transmitting instructions, information, and/or other data from the mobile device 108 and/or another source to the reading device 112. In some cases, the reading device 112 may communicate to the mobile device 108 whether the configuration succeeded or failed.

The method 300 may optionally determine whether to store configuration information for the reading device 112 (step 326). The configuration information may include specific setup data, configuration preferences, selected upgrades and/or features, and/or any other data corresponding to a particular reading device 112, access control system 100, configuring mobile device, configuring user, time, etc., and/or combinations thereof. When the method 300 determines that configuration information may be stored, the method 300 may proceed to step 332 (continued and described in conjunction with FIG. 4). Otherwise, the method 300 ends at step 328.

Figure 4:
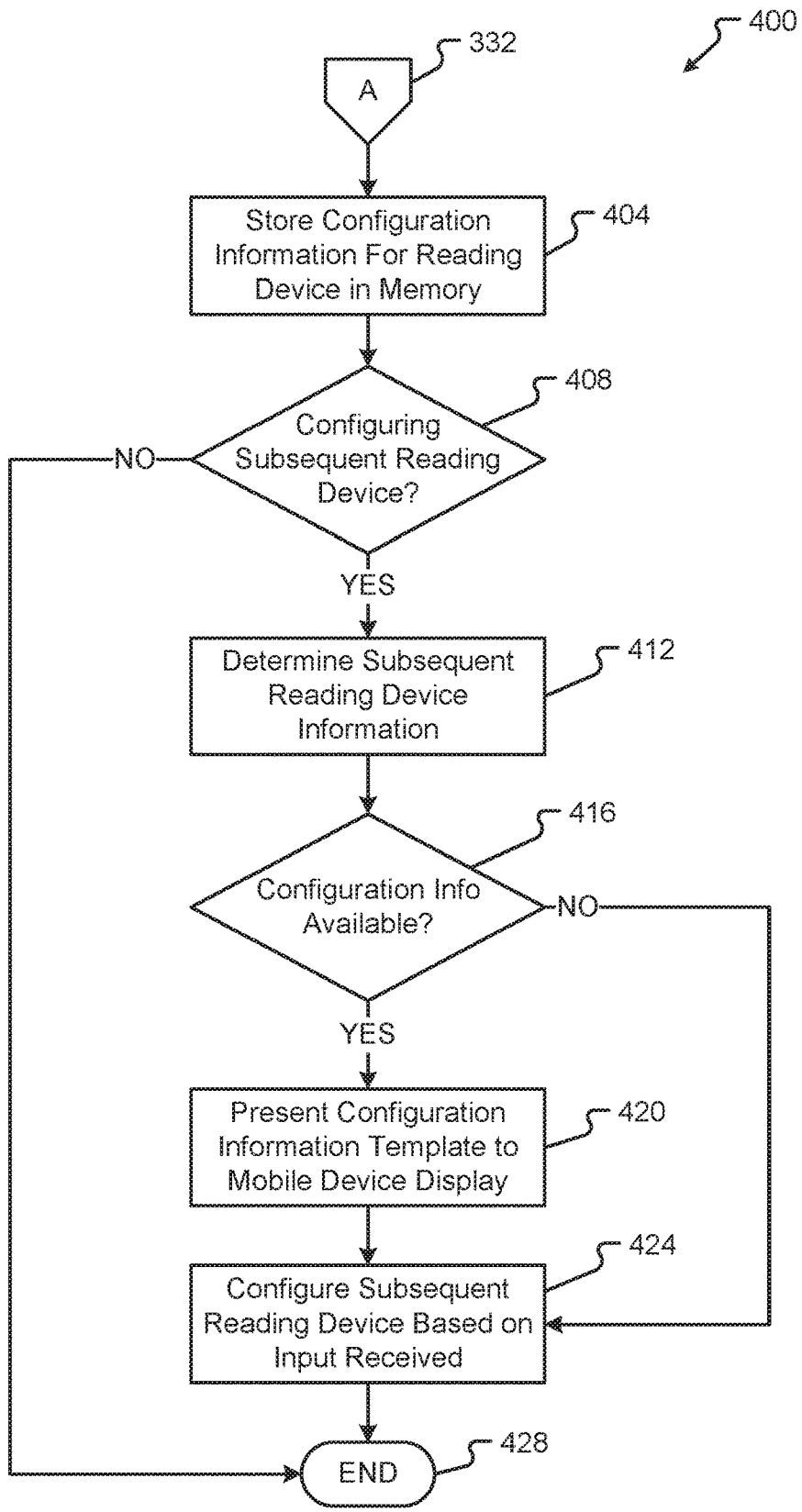
FIG. 4 is a flow chart depicting a method of configuring a reading device in accordance with embodiments of the present disclosure.

FIG. 4 is a flow chart depicting a method 400 of configuring a reading device 112 in accordance with embodiments of the present disclosure. While a general order for the steps of the method 400 is shown in FIG. 4, the method 400 can include more or fewer steps or can arrange the order of the steps differently than those shown in FIG. 4. Generally, the method 400 starts with a start operation and ends with an end operation 428. The method 400 can be executed as a set of computer-executable instructions executed by a computer system and encoded or stored on a computer readable medium. Hereinafter, the method 400 shall be explained with reference to the systems, components, modules, software, etc. described in conjunction with FIGS. 1-3.

In some embodiments, the method 400 may continue from step 332 described in conjunction with FIG. 3. The method 400 may proceed by storing configuration information for a reading device in a memory (step 404). In one embodiment, the memory may be associated with a server across a communication network. This configuration information may correspond to a particular reading device type, brand, manufacturer, etc. Additionally or alternatively, the configuration information may correspond to a particular access control system, company, facility, time, installing professional, mobile device 108, etc., and/or combinations thereof in some embodiments, the configuration information may be setup, or arranged, by an administrator and stored in the memory for access by one or more mobile devices in configuring reading devices 112 and/or locks 114 in an access control system 100. In any event, the configuration information may be stored in a template format.

The method 400 may continue by determining whether a subsequent reading device is being configured (step 408). In some embodiments, the subsequent reading device may correspond to another reading device that is configured subsequent to the reading device 112 configured and described in conjunction with FIG. 3. Additionally or alternatively, the subsequent reading device may correspond to a reading device that is being configured subsequent to the configuration information being stored in memory. In any event, configuring a subsequent reading device may commence when a communication is established between a mobile device 108 and the subsequent reading device. This communication may be similar, if not identical, to the communication described in conjunction with step 308 of FIG. 3.

Upon determining that the subsequent reading device is being configured, the method 400 may proceed by determining and/or receiving information about the subsequent reading device (step 412). This information may include configuration information about the subsequent reading device including, but in no way limited to, manufacturer, model, serial number, type, capabilities, enrolled access control system, etc. Additionally or alternatively, the information may include other configuration information such as firmware installed, date of last update, date of installation, installing entity, transfer rates, communication abilities, etc. In some embodiments, the subsequent reading device may be configured to provide this information in response to receiving a particular signal sent by the mobile device 108.

The signal sent by the mobile device 108 may include authentication and/or identification information of the mobile device 108. This information may be required to authorize the mobile device 108 and/or a request from the mobile device 108 for the configuration information from the subsequent reading device. In one embodiment of the present disclosure the authentication and/or identification information provided by the mobile device 108 may be authenticated by the subsequent reading device communicating the information to a trusted credential management system 132. In some embodiments, the subsequent reading device may enter a configuration mode, or allow configuration instructions to be received from the mobile device 108.

Next, the method 400 may continue by determining whether any configuration information is available for the subsequent reading device stored in the memory (step 416). In some embodiments, this determination may include the mobile device 108 communicating across a wireless communication network to a server 128 and secure memory. For example, in response to determining the configuration information for the subsequent reading device in step 412, the mobile device 108 may search the memory for any matching or upgraded stored configuration information for the subsequent reading device. If no matching or upgraded stored configuration information is available for the subsequent reading device, the method 400 may continue to step 424 and the mobile device 108 may proceed to configure the subsequent reading device based on input received at the mobile device 108.

In the event that matching or upgraded stored configuration information is available for the subsequent reading device, the method 400 may proceed by presenting the configuration information in a template format to the mobile device 108. For example, the mobile device 108 may be configured to render to a display or graphical user interface that a configuration information template is available for use in configuring the subsequent reading device. As provided above, this template may be arranged based on the configuration information, settings, and/or preferences associated with a previous configuration. In one embodiment, the entire configuration for the subsequent reading device may be made by selecting the appropriate configuration information template via the mobile device 108. In some embodiments, the subsequent reading device may be automatically configured to match the template when configuration of the subsequent reading device is authorized and the template is validated.

Whether via a user selection input or an automatic configuration input, the method 400 continues by configuring the subsequent reading device based on the type of input received at the mobile device (step 424). Once configured based on a template, a mobile device 108 may be permitted to alter specific configurable elements. In one embodiment, however, a mobile device 108 may be prohibited from changing specific elements or an arrangement thereof in the subsequent reading device. This selective permission may be based on a number of factors including, but in no way limited to, one or more an identification of the access control system for the subsequent reading device, the type of the subsequent reading device, the configuring mobile device identification, etc. The method 400 may repeat at step 408 in configuring additional reading devices or the method 400 may end at step 428.

The exemplary systems and methods of this disclosure have been described in relation to devices, systems, and methods in an access control system. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein. Moreover, it should be appreciated that the methods disclosed herein may be executed via a wearable device, a mobile device, a reading device, a communication device, and/or an access server of an access control system, etc.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, nethook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Embodiments include a method, comprising: receiving, from a reading device in an access control system, configuration information corresponding to a configuration status of the reading device; determining, by a configuration application running via a mobile device, a configuration of the reading device based at least partially on the configuration information received; determining, by the configuration application running via the mobile device, that the configuration of the reading device requires at least one change; and sending, via the mobile device, a configuration instruction to the reading device, the configuration instruction configured to change at least one feature of the reading device.

Aspects of the above method include wherein prior to receiving the configuration information, the method further comprises: initiating the configuration application via the mobile device; and interrogating, automatically and in response to initiating the configuration application, the reading device for the configuration information. Aspects of the above method include wherein the configuration information is received in response to a user providing an interrogation input via the mobile device, the interrogation input configured to send a request to the reading device for the configuration information. Aspects of the above method include wherein the configuration status includes at least one of an identification, location, operating status, manufacturer, type, make, current settings, active features, inactive features, versions of software installed, versions of firmware installed, and types of software installed on the reading device. Aspects of the above method include wherein the configuration information is received from the reading device that is in wireless communication with the mobile device. Aspects of the above method include wherein prior to sending the configuration instruction to the reading device, the mobile device is configured to present configuration options via a graphical user interface rendered to a display associated with the mobile device. Aspects of the above method include wherein the graphical user interface is configured as a template specific to a particular type of the reading device. Aspects of the above method include wherein prior to receiving the configuration information, the method further comprises: providing a configuration authorization code to the reading device that is configured to authenticate the mobile device and allow the mobile device to configure the reading device. Aspects of the above method include wherein the configuration authorization code is provided by the mobile device. Aspects of the above method include wherein the configuration authorization code is provided by a trusted credentials management system that is configured as a server remotely located across a communication network from the reading device. Aspects of the above method include a full mutual authentication comprising an installer application carrying a credential and authenticating with an administrator car and/or setup card, wherein the authentication enables a programming mode for the reading device allowing configuration of the reading device via the installer application. Aspects of the above method include wherein the installer application is running on the mobile device. Aspects of the above method further comprise: storing, in a memory of the access control system, a configuration for one or more reading devices in the access control system. Aspects of the above method include wherein the configuration for one or more reading devices includes information corresponding to a setup for the one or more reading devices, doors, and/or access points in the access control system. Aspects of the above method include wherein the memory is a database accessible across a communication network. Aspects of the above method include wherein the memory is part of a cloud or remote server platform. Aspects of the above method further comprise: storing, in a memory of the access control system, a configuration template including a changed configuration for the reading device. Aspects of the above method further comprise: receiving, from a subsequent reading device in the access control system, configuration information corresponding to a configuration status of the subsequent reading device; determining, by the configuration application running via the mobile device, that the configuration template stored in the memory applies to the subsequent reading device; determining, by the configuration application running via the mobile device, that the configuration of the subsequent reading device requires at least one change included in the configuration template; and sending, via the mobile device, a template configuration instruction to the subsequent reading device, the template configuration instruction configured to change features of the subsequent reading device to match the changed configuration in the configuration template.

Embodiments include a non-transitory computer readable medium having stored thereon instructions that, when executed by a processor, perform one or more of the methods above.

Embodiments include an access control system, comprising: a mobile device, comprising: a processor; and a memory having stored thereon instructions that, when executed by the processor, wirelessly interrogates a device for configuration information and based on the configuration information determines whether to send configuration instructions to the device, the configuration instructions configured to change at least one feature of the device; and a reading device configured to provide the configuration information in response to receiving an interrogation signal provided by the mobile device.

Aspects of the above system include wherein the reading device is further configured to authenticate the mobile device prior to providing the configuration information. Aspects of the above system include wherein the reading device is configured to exchange communications with a trusted credentials management system in authenticating the mobile device, and wherein the authentication includes determining whether the mobile device is authorized to provide configuration control instructions to the reading device. Aspects of the above system include wherein the trusted credentials management system is configured as a server remotely located across a communication network from the reading device. Aspects of the above system include wherein the trusted credentials management system provides a configuration authorization code to at least one of the mobile device and the reading device.

Embodiments include a mobile device, comprising: a processor; an antenna; a communications module; and a memory having stored thereon instructions that, when executed by the processor, interrogates a device for configuration information via a wireless interrogation signal transmitted via the antenna, receives configuration information corresponding to a configuration status of the device via the antenna, determines a configuration of the device, communicates, across a wireless communication network via the communications module, with an access control server for available configuration information templates for the device, and determines whether to send configuration instructions that are configured to change at least one firmware feature installed on the device based on at least one of the configuration information templates.

Aspects of the above mobile device further comprise: a display device configured to render available configuration options for the device in a graphical user interface, wherein at least one element rendered to the graphical user interface identifies one or more configuration templates that are available remotely on the access control server.

Any of the steps, functions, and operations discussed herein can be performed continuously and automatically.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® AMD™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

What is claimed is:

1. A method, comprising:
receiving, at a mobile device, configuration information from a reading device in an access control system corresponding to a configuration status of the reading device;
determining, by a configuration application running via the mobile device, a particular type of the reading device and a configuration of the reading device based at least partially on the configuration information received;
determining, by the configuration application running via the mobile device, a configuration template for the determined particular type of the reading device;
determining, by the configuration application running via the mobile device and based on the configuration template for the determined particular type of the reading device, that the configuration of the reading device requires at least one change; and
sending, via the mobile device, a template configuration instruction to the reading device, the template configuration instruction configured to change at least one feature of the reading device to match a changed configuration for the particular type of the reading device stored in the configuration template.

2. The method of claim 1, wherein prior to receiving the configuration information, the method further comprises:
initiating the configuration application via the mobile device; and
interrogating, automatically and in response to initiating the configuration application, the reading device for the configuration information.

3. The method of claim 1, wherein the configuration information is received in response to a user providing an interrogation input via the mobile device, the interrogation input configured to send a request to the reading device for the configuration information.

4. The method of claim 1, wherein the configuration status includes at least one of an identification, location, operating status, manufacturer, type, make, current settings, active features, inactive features, versions of software installed, versions of firmware installed, and types of software installed on the reading device.

5. The method of claim 1, wherein the configuration information is received from the reading device that is in wireless communication with the mobile device.

6. The method of claim 1, wherein prior to sending the template configuration instruction to the reading device, the mobile device is configured to present configuration options via a graphical user interface rendered to a display associated with the mobile device.

7. The method of claim 6, wherein the graphical user interface is configured as a template specific to the particular type of the reading device.

8. The method of claim 1, wherein prior to receiving the configuration information, the method further comprises:
providing a configuration authorization code to the reading device that is configured to authenticate the mobile device and allow the mobile device to configure the reading device.

9. The method of claim 8, wherein the configuration authorization code is provided by the mobile device.

10. The method of claim 8, wherein the configuration authorization code is provided by a trusted credentials management system that is configured as a server remotely located across a communication network from the reading device.

11. The method of claim 1, further comprising:
storing, in a memory of an access control server, the configuration template including the changed configuration for the reading device.

12. The method of claim 11, further comprising:
receiving, from a subsequent reading device in the access control system, configuration information corresponding to a configuration status of the subsequent reading device;
determining, by the configuration application running via the mobile device, that the configuration template stored in the memory applies to the subsequent reading device;
determining, by the configuration application running via the mobile device, that the configuration of the subsequent reading device requires at least one change included in the configuration template; and
sending, via the mobile device, a subsequent template configuration instruction to the subsequent reading device, the subsequent template configuration instruction configured to change features of the subsequent reading device to match the changed configuration in the configuration template.

13. A non-transitory computer readable medium having stored thereon instructions that, when executed by a processor, perform the method of claim 1.

14. An access control system, comprising:
a mobile device; comprising:
a processor; and
a memory having stored thereon instructions that, when executed by the processor, wirelessly interrogates a reading device for configuration information and based on the configuration information determines a particular type of the reading device and a configuration of the reading device, determines a configuration template for the determined particular type of the reading device, and determines whether to send configuration instructions to the reading device, the configuration instructions configured to change at least one feature of the reading device to match a changed configuration for the particular type of the reading device stored in the configuration template; and
the reading device configured to provide the configuration information in response to receiving an interrogation signal provided by the mobile device.

15. The access control system of claim 14, wherein the reading device is further configured to authenticate the mobile device prior to providing the configuration information.

16. The access control system of claim 15, wherein the reading device is configured to exchange communications with a trusted credentials management system in authenticating the mobile device, and wherein the authentication includes determining whether the mobile device is authorized to provide configuration control instructions to the reading device.

17. The access control system of claim 16, wherein the trusted credentials management system is configured as a server remotely located across a communication network from the reading device.

18. The access control system of claim 16, wherein the trusted credentials management system provides a configuration authorization code to at least one of the mobile device and the reading device.

19. A mobile device, comprising:
a processor;
an antenna;
a communications module; and
a memory having stored thereon instructions that, when executed by the processor, interrogates a reading device for configuration information via a wireless interrogation signal transmitted via the antenna, receives configuration information corresponding to a configuration status of the reading device via the antenna, determines a particular type of the reading device and a configuration of the reading device, communicates, across a wireless communication network via the communications module, with an access control server for available configuration information templates for the determined particular type of the reading device, and determines whether to send configuration instructions that are configured to change at least one firmware feature installed on the reading device based on a changed configuration stored in at least one of the configuration information templates for the determined particular type of the reading device.

20. The mobile device of claim 19, further comprising: a display device configured to render available configuration options for the reading device in a graphical user interface, wherein at least one element rendered to the graphical user interface identifies one or more configuration templates for the determined particular type of the reading device that are available remotely on the access control server.

* * * * *